(12) United States Patent (10) Patent No.: US 12,693,902 B2
Nelluri et al. (45) Date of Patent: Jul. 28, 2026

(54) SELF DESTRUCTION OF MICROSERVICES

(71) Applicant: Wells Fargo Bank, N.A., San Francisco, CA (US)

(72) Inventors: Govinda Rajulu Nelluri, Hyderabad (IN); Udaya Ramu Peethani, Hyderabad (IN); Narasimha M. Edala, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 522 days.

(21) Appl. No.: 18/324,639

(22) Filed: May 26, 2023

(65) Prior Publication Data

US 2024/0394108 A1 Nov. 28, 2024

(51) Int. Cl.
*G06F 9/46* (2006.01)
*G06F 9/50* (2006.01)
*G06F 16/951* (2019.01)

(52) U.S. Cl.
CPC .......... *G06F 9/5033* (2013.01); *G06F 16/951* (2019.01)

(58) Field of Classification Search
CPC .............................. G06F 9/5033; G06F 16/961
See application file for complete search history.

(56) References Cited

U.S. PATENT DOCUMENTS

| | | | |
|---|---|---|---|
| 7,467,375 B2 | 12/2008 | Tondreau et al. | |
| 8,997,051 B2 * | 3/2015 | Robertson ................. | G06F 8/62 717/124 |
| 9,213,540 B1 | 12/2015 | Rickey et al. | |

| | | | |
|---|---|---|---|
| 9,658,894 B2 * | 5/2017 | Feng ..................... | G06F 9/5022 |
| 10,996,935 B2 | 5/2021 | Jonnadula et al. | |
| 10,996,948 B2 | 5/2021 | Nelluri et al. | |
| 11,115,275 B2 | 9/2021 | Tanna et al. | |

(Continued)

FOREIGN PATENT DOCUMENTS

| | | | | |
|---|---|---|---|---|
| CN | 110333875 A | 10/2019 | | |
| KR | 102145422 B1 * | 8/2020 | ............. | H04L 43/16 |

OTHER PUBLICATIONS

Cortellessa et al., "A model-driven approach for continuous performance engineering in microservice-based systems", Journal of Systems and Software, vol. 183, Jan. 2022, 18 pp.

*Primary Examiner* — Diem K Cao

(74) *Attorney, Agent, or Firm* — Shumaker & Sieffert, P.A.

(57) ABSTRACT

This disclosure describes techniques that include eliminating duplicative microservices and/or consolidating microservices, thereby reducing the number of microservices being used, and enabling a more efficient use of resources consumed by microservices. The techniques include obtaining, by a computing system, data about a plurality of microservices that are available to provide services on a network, identifying, based on usage statistics, a legacy microservice to be decommissioned, wherein the legacy microservice is included in the plurality of microservices available to provide services on the network, and wherein making the legacy microservice available on the network consumes resources on the network, configuring the legacy microservice to be capable of deallocating the resources consumed on the network; routing requests intended for the legacy microservice to another microservice, and after routing requests intended for the legacy microservice to the other microservice, enabling the legacy microservice to deallocate the resources.

20 Claims, 7 Drawing Sheets

(56) References Cited

U.S. PATENT DOCUMENTS

| 11,334,349 | B2 | 5/2022 | Gupta |
| 2008/0320054 | A1 | 12/2008 | Howard et al. |
| 2020/0007418 | A1* | 1/2020 | Greenstein ........... G06F 9/5077 |
| 2020/0296172 | A1* | 9/2020 | Gunjal ................. G06N 3/0442 |

* cited by examiner

SELF DESTRUCTION OF MICROSERVICES

TECHNICAL FIELD

This disclosure relates to computer systems and, in particular, services provided by microservices on a computer network.

BACKGROUND

Microservices are often used to build applications that are resilient, highly scalable, independently deployable, and able to evolve quickly. Microservices have enabled organizations to move away from legacy systems, primarily by breaking monolith applications into smaller, more nimble services.

SUMMARY

This disclosure describes techniques that include eliminating duplicative microservices and/or consolidating microservices, thereby reducing the number of microservices being used, and enabling a more efficient use of resources consumed by microservices. In some examples, microservices are configured and/or modified to make such microservices to be self-aware of their usage and resource consumption. Where appropriate, such self-aware microservices can remove themselves from the microservices ecosystem. When a microservice removes itself from the ecosystem, it may release the resources it previously consumed, thereby making such resources available for other productive purposes.

In some examples, techniques described herein include identifying a legacy microservice to be decommissioned, initializing a stand-in microservice, and routing traffic to the stand-in microservice instead of the legacy microservice. Further techniques may include decommissioning the legacy microservice, routing traffic to a replacement microservice instead of the stand-in microservice, and decommissioning the stand-in microservice.

To identify microservices that may be eligible or appropriate for decommissioning, a computing system may crawl a network to collect usage statistics associated with microservices on the network. Using the usage statistics and other information, a computing system may identify microservices that are eligible for decommissioning. A computing system may also modify a microservice or the container in which the microservice executes. In some examples, such a modification can be performed by injecting a decommission plug-in into the microservice. The plug-in may then instantiate a decommission counter and/or otherwise modify the microservice with a counter. In some examples, a stand-in service may be used to facilitate the transition to a next-generation microservice, and traffic destined for the legacy microservice may then be at least temporarily routed to the stand-in microservice. The computing system may utilize the counter to count down the final amount of time or number of operations remaining to be performed by the legacy microservice, and thereby determine when the legacy microservice is ready to be decommissioned. The computing system may route network traffic that might otherwise be directed to the stand-in service to the replacement microservice. The computing system eventually decommissions both the legacy microservice and the stand-in microservice.

The techniques of this disclosure may provide one or more advantages. For instance, the ability to identify legacy microservices that can be decommissioned and route traffic instead to a different microservice may reduce the complexity of organizational and/or business operations and may help ensure that users are using fewer microservices (or even a single microservice) instead of redundant microservices that accomplish the same purpose. Automatically identifying and decommissioning legacy microservices may reduce the workload of administrators, since such administrators might not have to manually identify and decommission unnecessary microservices. In addition, automatically identifying microservices eligible for decommissioning using an automated mechanism for identifying legacy microservices may enable the identification of microservices that might otherwise not have been identified. Further, automatically activating a stand-in or placeholder microservice and rerouting network traffic may help reduce service disruptions and manual reconfiguration of workflows to use stand-in and/or replacement microservices.

In some examples, this disclosure describes operations performed by a computing system in accordance with one or more aspects of this disclosure. In one specific example, this disclosure describes a method comprising obtaining, by a computing system, data about a plurality of microservice that are available to provide services on a network, identifying, based on usage statistics, a legacy microservice to be decommissioned, wherein the legacy microservice is included in the plurality of microservices available to provide services on the network, and wherein making the legacy microservice available on the network consumes resources on the network, configuring the legacy microservice, by the computing system, to be capable of deallocating the resources consumed on the network, routing, by the computing system, requests intended for the legacy microservice to another microservice, and after routing requests intended for the legacy microservice to the other microservice, enabling, by the computing system, the legacy microservice to deallocate the resources.

In another example, this disclosure describes a system comprising a storage system and processing circuitry having access to the storage system, wherein the processing circuitry is configured to carry out operations described herein. In yet another example, this disclosure describes a computer-readable storage medium comprising instructions that, when executed, configure processing circuitry of a computing system to carry out operations described herein.

The details of one or more examples are set forth in the accompanying drawings and the description below. Other features, objects, and advantages will be apparent from the description and drawings, and from the claims.

DETAILED DESCRIPTION

Figure 1:
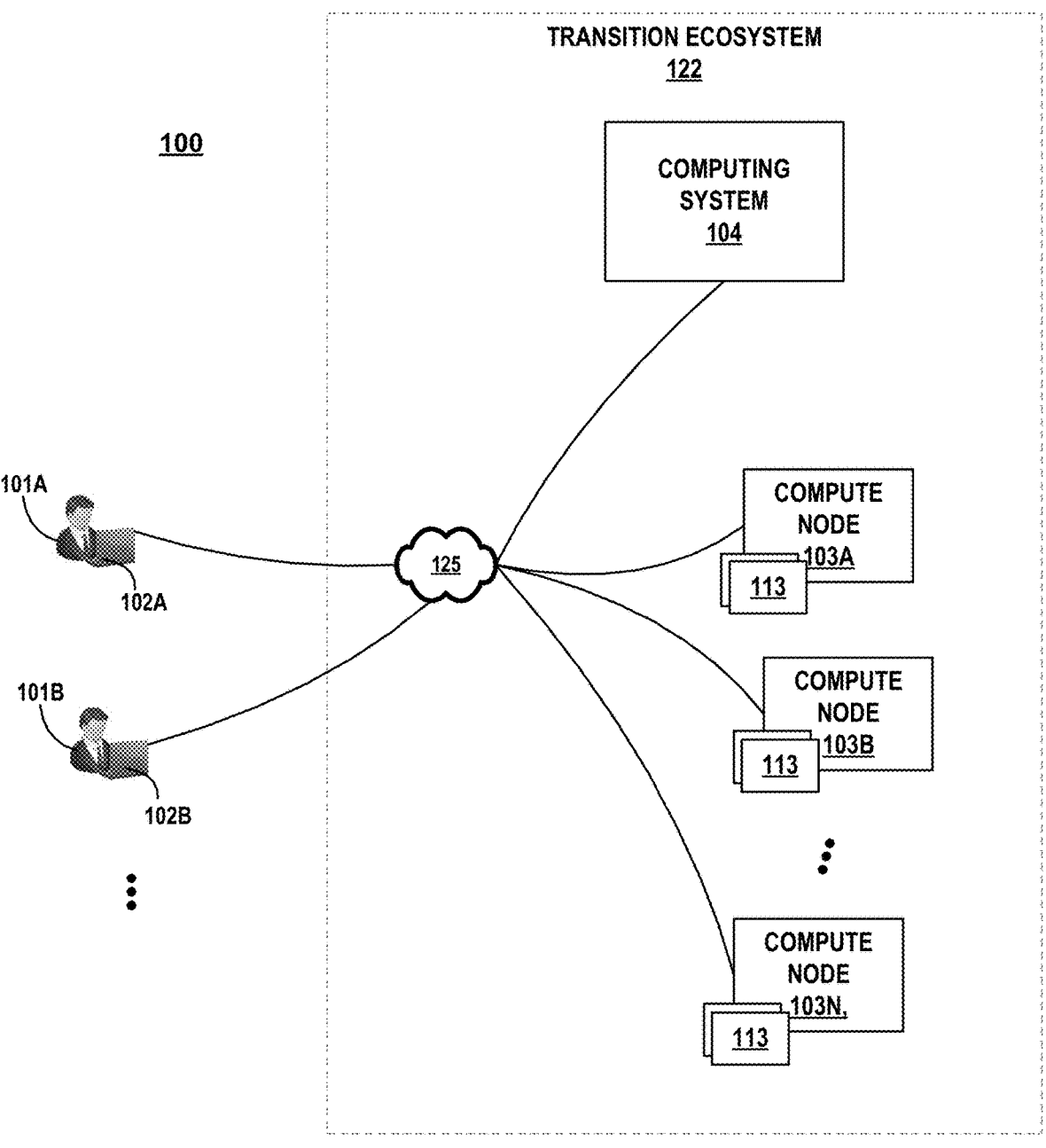
FIG. 1 is a conceptual diagram illustrating an environment in which services perform self-destruction operations, in accordance with one or more aspects of the present disclosure.

FIG. 1 is a conceptual diagram illustrating an environment in which services perform self-destruction operations, in accordance with one or more aspects of the present disclosure. Illustrated in FIG. 1 is a transaction ecosystem 122, which includes a number of compute nodes 103A through 103N ("compute nodes 103"), each connected through a network 125. Each of nodes 103 may execute one or more microservices 113, which may perform functions relating to organization or corporate services on behalf of or at the direction of various client devices 102A through 102M ("client devices 102"). Each of client devices 102 may be operated by a corresponding user 101 (e.g., user 101A operates 102A, 101B operates 102B).

Transaction ecosystem 122 may also include computing system 104. Computing system 104 may, as described herein, orchestrate and/or facilitate transitions from one microservice 113 to another microservice 113 within transition ecosystem 122. In some examples, transition ecosystem 122 serves as an environment for the replacement of legacy microservices (e.g., various microservices 113) and the rerouting of traffic from a legacy microservice to a replacement microservice 113.

In an example that can be described in the context of FIG. 1, computing system 104 uses a behavior extractor to obtain data such as usage metrics of the microservices. Computing system 104 uses such data to identify microservices for replacement and decommissioning. To obtain the data, computing system 104 uses the behavior extractor to crawl one or more networks for microservices for decommissioning.

Computing system 104 may use the data obtained by the behavior extractor to determine that a microservice, such as one of the microservices 113 on compute node 103A, is eligible for decommissioning. Computing system 104 may make this determination based on one or more factors. Such factors could include the level of traffic directed to a microservice, whether there are duplicate or similar microservices available that perform similar functions to the microservice, the version of the microservice, and whether there is a newer version of the microservice available.

Computing system 104 may inject a plug-in into the legacy microservice to assist in transitioning traffic from a legacy microservice to a replacement microservice. A legacy microservice might not have a built-in function for self-decommissioning, so the computing system 104 can use the injector to add code to microservices 113 to make such microservices 113 capable of decommissioning the resources they use. In some examples, such a plug-in may make microservices 113 self-aware and capable of determining when it should be killed or deallocated. Computing system 104 may use the injected plug-in to determine when traffic received by the legacy microservice has dropped to a threshold at which there will be minimal disruption to users such as user 102A when the legacy microservice is decommissioned (e.g., when there is little to no traffic received within a predetermined threshold). Computing system 104 may utilize the plug-in to decommission the legacy microservice through de-allocation of any system resources consumed by the legacy microservice.

Computing system 104 may, in some examples, activate a stand-in microservice while orchestrating a transition from a legacy microservice to a replacement microservice. Computing system 104 may use a stand-in microservice that replicates the functionality of the legacy microservice to assist in transitioning from the legacy microservice to the replacement microservice. Although such a stand-in might not be required for all transitions, it may be useful in some cases, particularly where the risk that may accompany a failed transition from a legacy microservice to a more evolved microservice is too great (e.g., some transitions performed by systems that support a financial institution). Computing system 104 may decommission the stand-in microservice in a similar manner as the legacy microservice as part of transitioning from the stand-in microservice to the replacement microservice.

Figure 2:
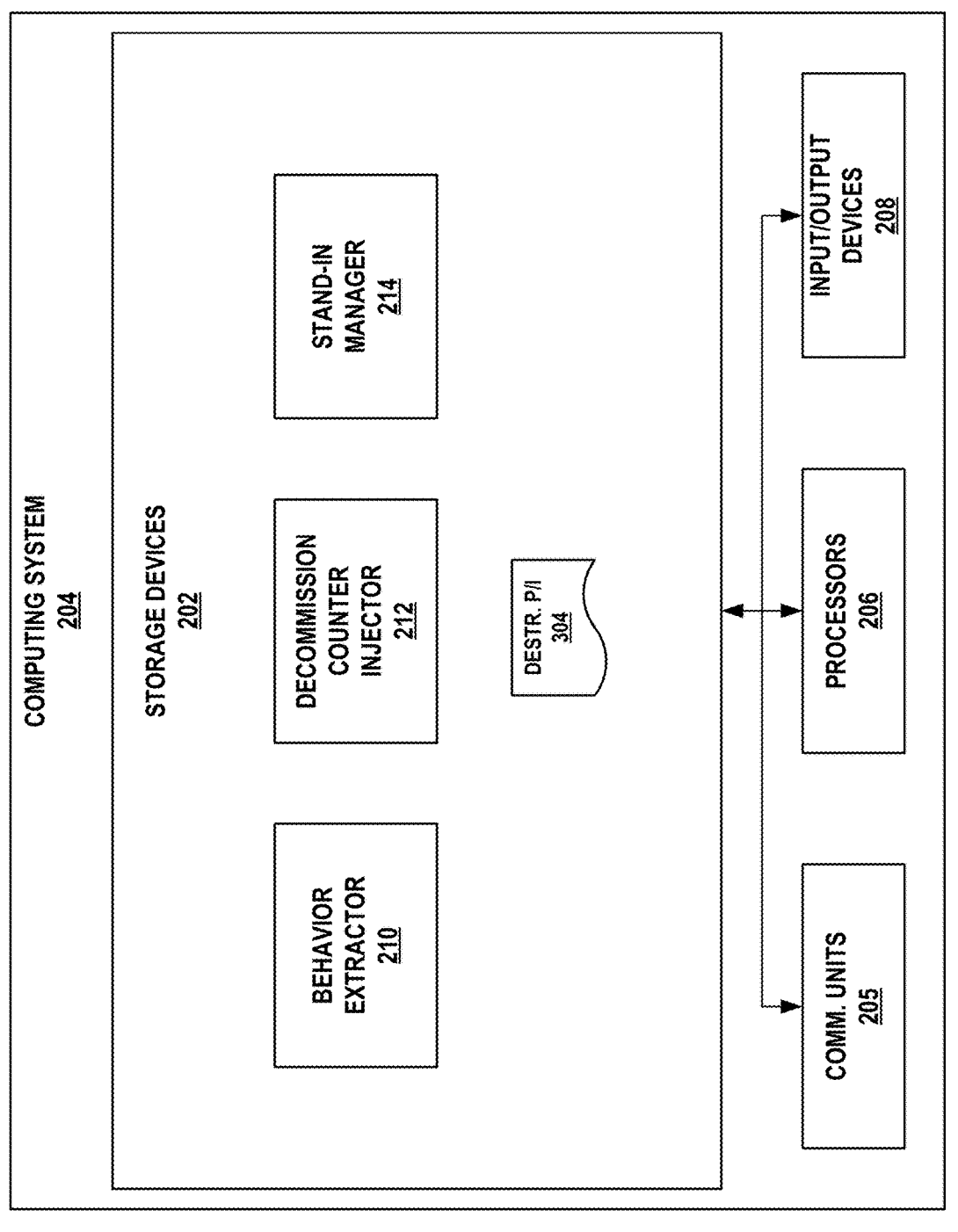
FIG. 2 is a block diagram illustrating a computing system or orchestration system 204 configured to perform operations within a transition ecosystem, in accordance with one or more aspects of the present disclosure.

FIG. 2 is a block diagram illustrating a computing system or orchestration system 204 configured to perform operations within a transition ecosystem, in accordance with one or more aspects of the present disclosure. Computing system 204 of FIG. 2 is illustrated as a block diagram with specific components and data modules. In examples described in connection with FIG. 2, computing system 204 may correspond to, or may be considered an example or alternative implementation of computing system 104 of FIG. 1. For ease of illustration, computing system 204 is illustrated in FIG. 2 as a single computing system. However, in other examples, computing system 204 may comprise multiple devices or systems, such as systems distributed across a data center or multiple data centers. For example, separate computing systems may implement functionality performed by each of behavior extractor 210, decommission counter injector 212, and/or stand-in manager 214, described below. Alternatively, or in addition, computing system 204 (or various modules illustrated in FIG. 2 as included within computing system 204) may be implemented through distributed virtualized compute instances (e.g., virtual machines, containers) of a data center, cloud computing system, server farm, and/or server cluster.

In FIG. 2, computing system 204 is illustrated as including underlying physical hardware that includes one or more processors 206, one or more communication units 205, one or more input/output devices 208, and one or more storage devices 202. Storage devices 202 may include various modules or otherwise-implemented logic for performing various functions described herein. Such modules may include behavior extractor 210, decommission counter injector 212, and/or stand-in manager 214. One or more of the devices, modules, storage areas, or other components of computing system 204 may be interconnected to enable inter-component communications (physically, communicatively, and/or operatively). In some examples, such connectivity may be provided by through communication channels, which may include a system bus, a network connection, an inter-process communication data structure, or any other method for communicating data.

One or more processors 206 of computing system 204 may implement functionality and/or execute instructions associated with computing system 204 or associated with one or more modules illustrated herein and/or described below. One or more processors 206 may be, may be part of, and/or may include processing circuitry that performs operations in accordance with one or more aspects of the present disclosure. One or more communication units 205 of computing system 204 may communicate with devices external to computing system 204 (e.g., nodes 103 or microservices 113 in FIG. 1) by transmitting and/or receiving data, and may operate, in some respects, as both an input device and an output device. In some or all cases, communication units 205 may communicate with other devices or computing systems over network 125 or over other networks.

One or more input/output devices 208 may represent any input or output devices of computing system 204 not otherwise separately described herein. Input/output devices 208 may generate, receive, and/or process output from any type of device capable of outputting information to a human or machine. For example, one or more input devices 208 may generate, receive, and/or process input in the form of electrical, physical, audio, image, and/or visual input (e.g., peripheral device, keyboard, microphone, camera). Correspondingly, one or more output devices 208 may generate, receive, and/or process output in the form of electrical and/or physical output (e.g., peripheral device, actuator).

One or more storage devices 202 within computing system 204 may store information for processing during operation of computing system 204. Storage devices 202 may store program instructions and/or data associated with one or more of the modules described in accordance with one or more aspects of this disclosure. One or more processors 206 and one or more storage devices 202 may provide an operating environment or platform for such modules, which may be implemented as software, but may in some examples include any combination of hardware, firmware, and software. One or more processors 206 may execute instructions and one or more storage devices 202 may store instructions and/or data of one or more modules. The combination of processors 206 and storage devices 202 may retrieve, store, and/or execute the instructions and/or data of one or more applications, modules, or software. Processors 206 and/or storage devices 202 may also be operably coupled to one or more other software and/or hardware components, including, but not limited to, one or more of the components of computing system 204 and/or one or more devices or systems illustrated or described as being connected to computing system 204.

Behavior extractor 210 may perform functions relating to crawling network 125 for data on microservices and microservice usage statistics. Behavior extractor 210 may obtain data regarding one or more microservices connected to network 125 such as microservice usage statistics, availability of replacement microservices, existence of duplicate microservices, and other data regarding microservices. Behavior extractor may be a component or module of computing system 204, as illustrated in FIG. 2.

Decommission counter injector 212 may perform functions relating to determining whether a legacy microservice should be decommissioned. Decommission counter injector 212 may utilize data from behavior extractor 210 to determine whether one or more legacy microservices should be decommissioned. Decommission counter injector 212 may, for example, identify legacy microservice 313L (see FIG. 3A) as a microservice eligible for decommissioning. In one example, microservice 313L retrieves customer account details from two databases connected to a network (e.g., network 125 of FIG. 1), while replacement microservice 313R (also illustrated in FIG. 3A) is a newer or more-evolved revision of legacy microservice 313L that retrieves customer account details from only one of the same databases as legacy microservice 313L. Decommission counter injector 212 may determine that as legacy microservice 313L retrieves customer data from a database that replacement microservice 313R does not access, legacy microservice 313L should not yet be decommissioned to ensure access to that database.

Decommission counter injector 212 may configure a microservice to be self-aware, and capable of determining when it is appropriate to decommission itself and deallocate resources it might otherwise consume. In some examples, decommission counter injector 212 performs such operations by injecting destructor plug-in 304 into a microservice (e.g., a legacy microservice 313L). By injecting destructor plug-in 304 into a microservice, that microservice is configured to be capable of deallocating the resources the microservice consumes on the network, even if the microservice was not originally designed to be self-aware in that manner, and/or not originally designed to have integrated self-decommissioning functionality. Decommission counter injector 304 may leverage AI based on Bayesian networks to inject behaviors such as self-decommissioning into microservice. In some examples, destructor plug-in 304 might be implemented using an inversion of control design pattern. Decommission counter injector 212 may obtain data from a legacy microservice that enables decommission counter injector 212 to customize the process to be used to decommission the microservice. Decommission counter injector 212 may be a component or module of computing system 204, as illustrated in FIG. 2.

Stand-in manager 214 may perform functions relating to managing a stand-in service that takes the place of a legacy microservice, prior to a full transition to a replacement and/or more evolved service. In some examples, stand-in manager 214 may spin up a virtualized computing instance (container or virtual machine) to serve as a stand-in service to be used temporarily before transitioning to another service. The other service serves as a longer-term replacement service for a legacy service that is being decommissioned.

In general, computing system 204 may perform functions relating to interacting with systems and/or microservices within transition ecosystem 122 of FIG. 1 (or transition ecosystem 222 of FIG. 3) and orchestrating transitions from legacy to replacement microservices. In some examples, computing system 204 may operate by causing behavior extractor 210 to direct decommission counter injector 212 and/or stand-in manager 214 to perform various functions described herein. In other examples, computing system 204 may implement functionality performed by decommission counter injector 212 and/or stand-in manager 214 separately from behavior extractor 210. In such an example, an additional module (not specifically shown in FIG. 2) within computing system 204 might direct operations of decommission counter injector 212 and/or stand-in manager 214.

Modules illustrated in FIG. 2 (e.g., behavior extractor 210, decommission counter injector 212, stand-in manager 214) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 3A:
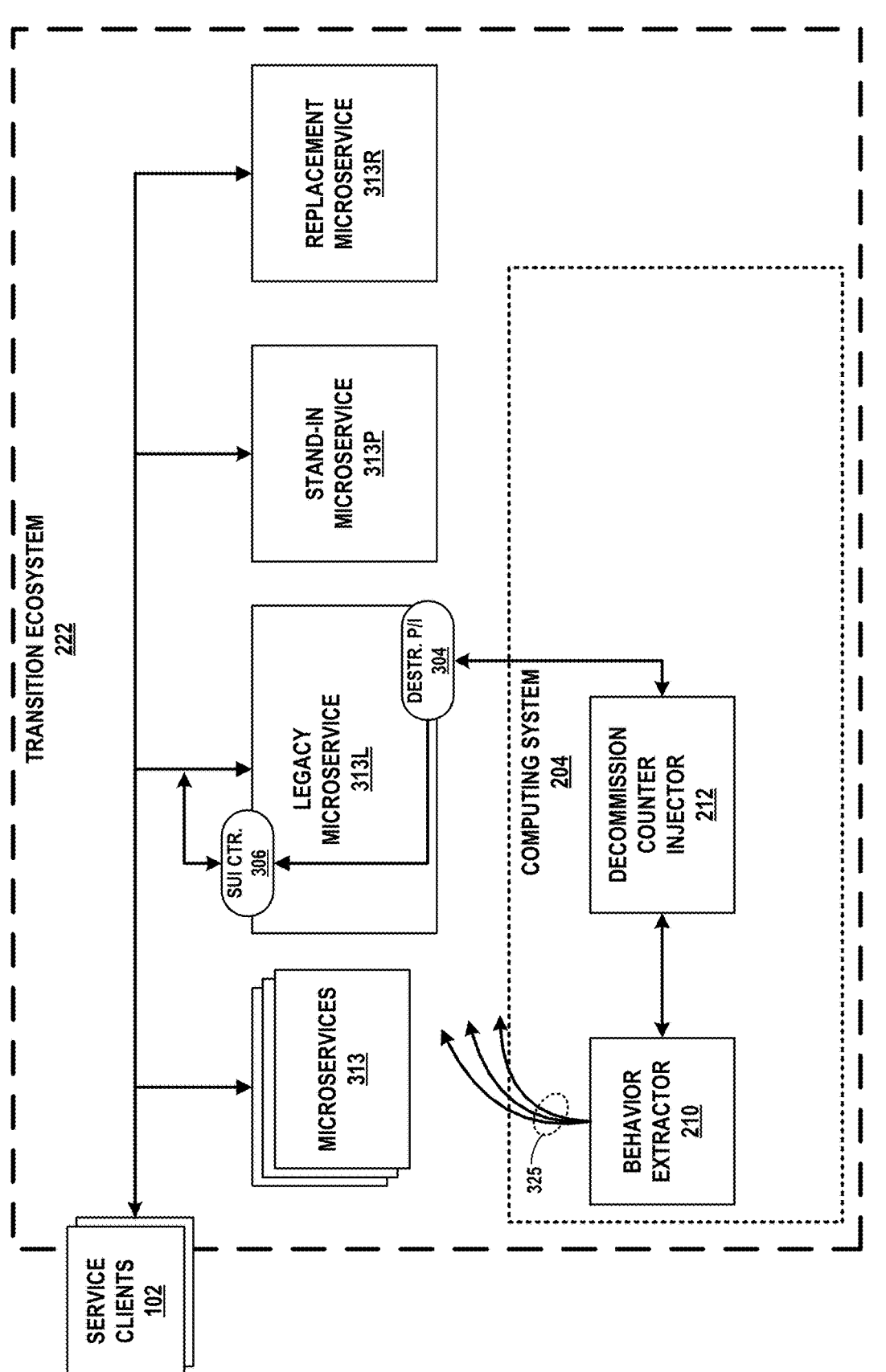
FIGS. 3A-3D are conceptual and block diagrams illustrating an example transition from a legacy microservice to a replacement microservice, in accordance with one or more aspects of the present disclosure.

FIG. 3A through FIG. 3D are block diagrams illustrating an example transition from a legacy microservice to a replacement microservice, in accordance with one or more aspects of the present disclosure. FIG. 3A illustrates an example computing system identifying a microservice 313 to be decommissioned and/or deallocated, and illustrates transition ecosystem 222. Transaction ecosystem 222 may be an example of the transition ecosystem 122 described and illustrated in FIG. 1. FIG. 3A includes behavior extractor 210 and decommission counter injector 212 which may be components corresponding to behavior extractor 210 and decommission counter injector 212 of computing system 204 of FIG. 2. Accordingly, in FIG. 3A, computing system 204 may be considered as operating within transaction ecosystem 222.

In FIG. 3A, service clients 102 interact with and obtain services from microservices 313 (including from legacy microservice 313L and replacement microservice 313R). In one example described herein, computing system 204 facilitates a transition from legacy microservice 313L to a replacement microservice 313R. To facilitate such a transition, modules included within computing system 204 (e.g., behavior extractor 210 and decommission counter injector 212) may interact with various systems within transition ecosystem 222 over a network, and may employ a stand-in or placeholder microservice 313P as well as other components and/or computing systems.

In operation, and in accordance with one or more aspects of the present disclosure, computing system 204 may identify legacy microservices eligible for decommissioning. For example, computing system 204 detects input and outputs information about the input to behavior extractor 210. Behavior extractor 210 of computing system 204 determines that the input corresponds to a command (from an administrator) to crawl transition ecosystem 222 and collect data. Behavior extractor 210 crawls transaction ecosystem 222 to collect data (crawling operation intended to be represented by arrows 325). To perform the crawling operation, behavior extractor 210 may cause communication unit 205 of computing system 204 to output various signals over a network, interact with various microservices 313, and collect information in response to such signals. Behavior extractor 210 eventually obtains data that may include usage statistics pertaining to microservices 313, the availability of newer, more capable, and/or more popular versions of microservices 313, whether similar or duplicates of microservices are available, and other factors.

Computing system 204 may identify a microservice 313 that could replace a legacy microservice. For example, behavior extractor 210 of transition ecosystem 222 evaluates information about the data collected. Behavior extractor 210 identifies, based on the collected data, a legacy microservice 313L that is a candidate for replacement. Behavior extractor 210 also identifies one or more replacement microservices 313R that can replace microservice 313L. In some examples, behavior extractor 210 may identify multiple microservices that all provide the same functionality but are located within different nodes 103 (see FIG. 1). For example, one line of business within an organization may use one microservice, but another line of business may use a different microservice that provides the same functionality. In another example, behavior extractor 210 might determine that multiple microservices 313 are all different, older versions of another microservice 313R. In such an example, behavior extractor 210 may determine that the older microservices can be replaced by a single microservice (e.g., microservice 313R).

Computing system 204 may prepare to decommission legacy microservice 313L. For example, behavior extractor 210 of computing system 204 causes decommission counter injector 212 to inject destructor plug-in 304 into legacy microservice 313L. In some examples, destructor plug-in 304 then instantiates logic within microservice 313L (or a container or other virtualized instance implementing microservice 313L) to implement a suicide count function. For example, destructor plug-in 304 may instantiate a "suicide counter" 306 (hereinafter "SUI counter 306") within microservice 313L (or an associated virtualized instance), which monitors time and/or operations to determine when microservice 313L should decommission itself. In some examples, destructor-plugin may self-instantiate, self-inject, and/or self-appoint itself within legacy microservice 313L based on a determination to decommission legacy microservice 313L by behavior extractor 210. In some examples, destructor plug-in 304 may also interact with SUI counter 306 and monitor operations of legacy microservice 313L. SUI counter 306 may be a component of destructor plug-in 304 and/or decommission counter injector 212, and may count down (by time or by operations or in another way) to the decommissioning of legacy microservice 313L. SUI counter 306 may identify modifications necessary to decommission microservices such as commands to decommission code or software code. For example, SUI counter 306 may determine that in order to decommission a microservice, SUI counter 306 needs to inject software written in Java, or in .NET code, or by following conventions for some other technology, standard, or platform. SUI counter 306 may continue to monitor usage patterns of microservice 313L. SUI counter 306 may report information about the usage patterns to destructor plug-in 304 and/or to decommission counter injector 212. SUI counter 306 and/or the destructor plug-in 304 may eventually carry out the destruction of microservice 313L.

Figure 3B:
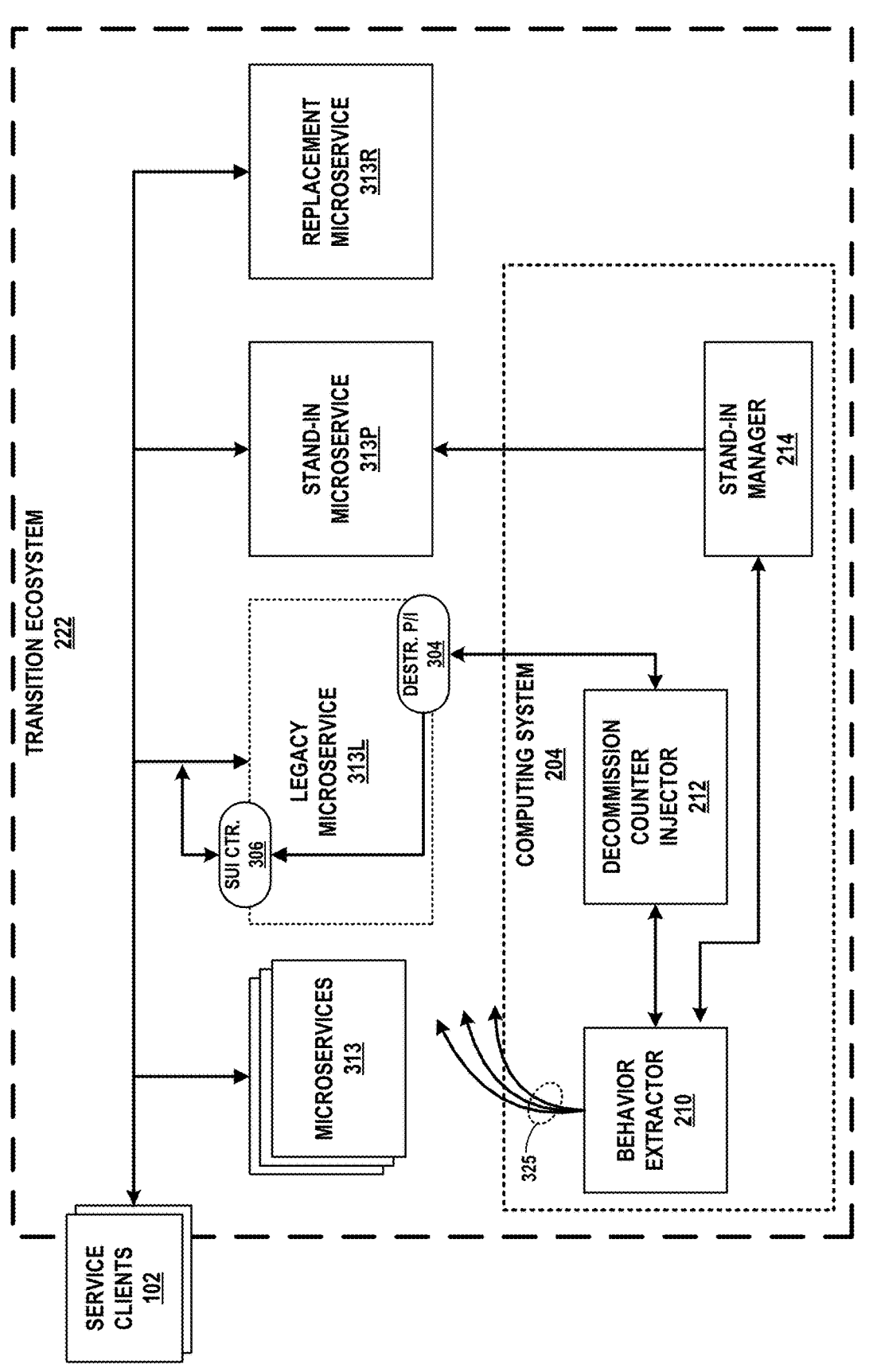

FIG. 3B illustrates an example computing system instantiating a stand-in microservice to be used during the transition of the legacy microservice to the replacement microservice, in accordance with one or more aspects of the present disclosure. Computing system 204 as illustrated in FIG. 3B also includes stand-in manager 214, which may correspond to stand-in manager 214 described in connection with FIG. 2. In FIG. 3B, stand-in manager 214 is used to identify or instantiate a stand-in microservice 313P for use in transitioning from legacy microservice 313L to replacement microservice 313R. Typically, stand-in manager 214 of computing system 204 instantiates, spins-up, or otherwise activates microservice 313P, which may serve as a temporary microservice to be used temporarily prior to fully transitioning to a microservice 313R. In such an example, stand-in manager 214 interacts with microservice 313P and configures, over a network, stand-in microservice 313P to perform operations similar to those performed by legacy microservice 313L. Stand-in manager 214 activates stand-in microservice 313P and configures stand-in microservice 313P to process operations previously handled by legacy microservice 313L. Stand-in manager 214 performs such configurations in anticipation of a transition from legacy microservice 313L to replacement microservice 313R. Stand-in microservice 313P may be similar to or a copy of replacement microservice 313R.

Computing system 204 may redirect traffic from legacy microservice 313L to stand-in microservice 313P. For example, computing system 204 routes requests intended for legacy microservice 313L to stand-in microservice 313P. To do so, computing system 204 may configure a network to cause traffic previously directed to microservice 313L to be redirected to microservice 313P. Computing system 204 may redirect traffic in stages or progressively redirect traffic to avoid potential service disruptions to users still relying on legacy microservice 313L.

Once microservice 313P is in place and/or operating, destructor plug-in 304 may eventually determine that legacy microservice 313L is ready for decommissioning. For example, destructor plug-in 304 may receive information from SUI counter 306 about traffic levels being processed by legacy microservice 313L. Destructor plug-in 304 may, based on that information, determine that little or no traffic is being directed to legacy microservice 313L. In some examples, SUI counter 306 may determine that sufficient time has passed and/or usage patterns have evolved enough to make decommissioning of microservice 313L appropriate. In such a situation, decommission counter injector 212 and/or destructor plug-in 304 may conclude that legacy microservice 313L is ready for decommissioning. In response, destructor plug-in 304 causes legacy microservice 313L to be decommissioned. Destructor plug-in 304 may conduct the decommissioning of microservice 313L by causing legacy microservice 313L to stop executing, undeploy the microservice, and unallocated any system resources assigned to legacy microservice 313L.

Figure 3C:
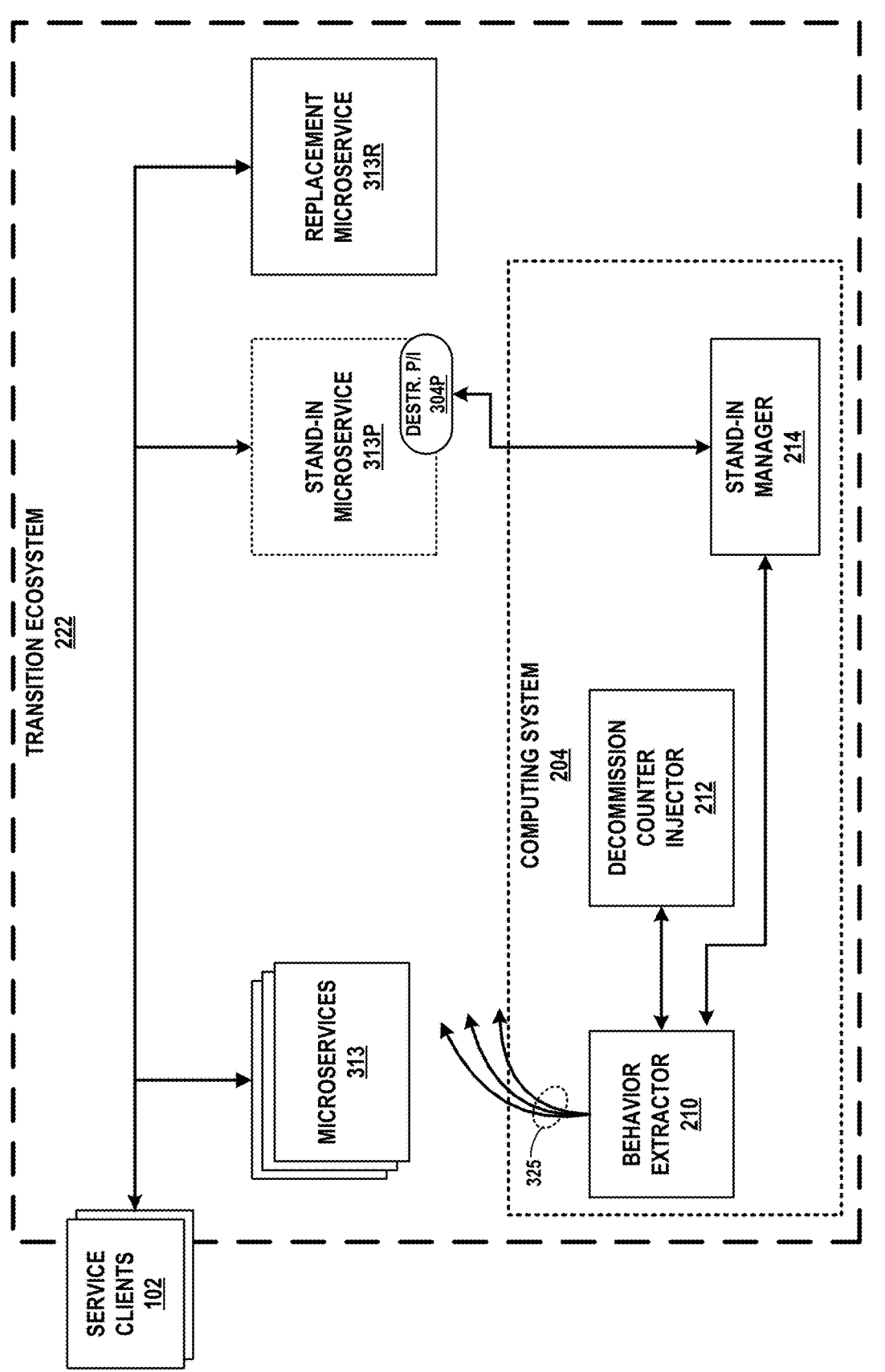

FIG. 3C illustrates an example computing system preparing to decommission and/or deallocate the stand-in microservice in favor of the replacement microservice, in accordance with one or more aspects of the present disclosure. In the example of FIG. 3C, microservice 313L has already been decommissioned and deallocated. At least some of the traffic previously processed by microservice 313L is being handled by microservice 313P. Microservice 313P may be a near-copy of microservice 313R. By monitoring the operation of microservice 313P in handling traffic previously handled by microservice 313L, it may be possible to evaluate whether replacement microservice 313R will be capable of serving as a replacement microservice for microservice 313L.

In some environments, it may be possible to transition directly from microservice 313L to microservice 313R, without use of a stand-in microservice 313. In other words, use of stand-in microservice 313 may be optional. However, in some situations, particularly in the financial industry or other heavily-regulated industries, inappropriate risk might accompany such a transition, so it may be more appropriate to verify operations through use of a stand-in microservice 313, as described herein.

Stand-in manager 214 may perform an evaluation of operations and eventually conclude that no unacceptable limitations, errors, bugs, or other inappropriate behaviors are exhibited by microservice 313P when processing traffic. In such an example, stand-in manager 214 injects stand-in microservice 313P with destructor plug-in 304P, which may be similar to or the same as destructor plug-in 304 used for microservice 313L. Destructor plug-in 304P may also instantiate a version of SUI counter 306 within microservice 313P (not specifically shown in FIG. 3C), which may operate in a manner similar to how SUI counter 306 operated within microservice 313L. In such an example, SUI counter 306 may monitor usage patterns and traffic to stand-in microservice 313P and report information about the usage patterns and traffic to destructor plug-in 304P.

Before decommissioning microservice 313P, computing system 204 may redirect traffic from microservice 313P to microservice 313R. For example, computing system 204 routes requests intended for stand-in microservice 313P to replacement microservice 313R. To do so, computing system 204 may perform network configurations or adjust routing tables to cause traffic to be appropriately re-routed. Computing system 204 may redirect traffic in stages or progressively redirect traffic to avoid potential service disruptions to users still relying on legacy microservice 313P.

Eventually, destructor plug-in 304P may determine, based on the information about the usage patterns and traffic, that stand-in microservice 313P is ready to be decommissioned. In response to such a determination, destructor plug-in 304 decommissions stand-in microservice 313P and de-allocates system resources of stand-in microservice 313P.

Figure 3D:
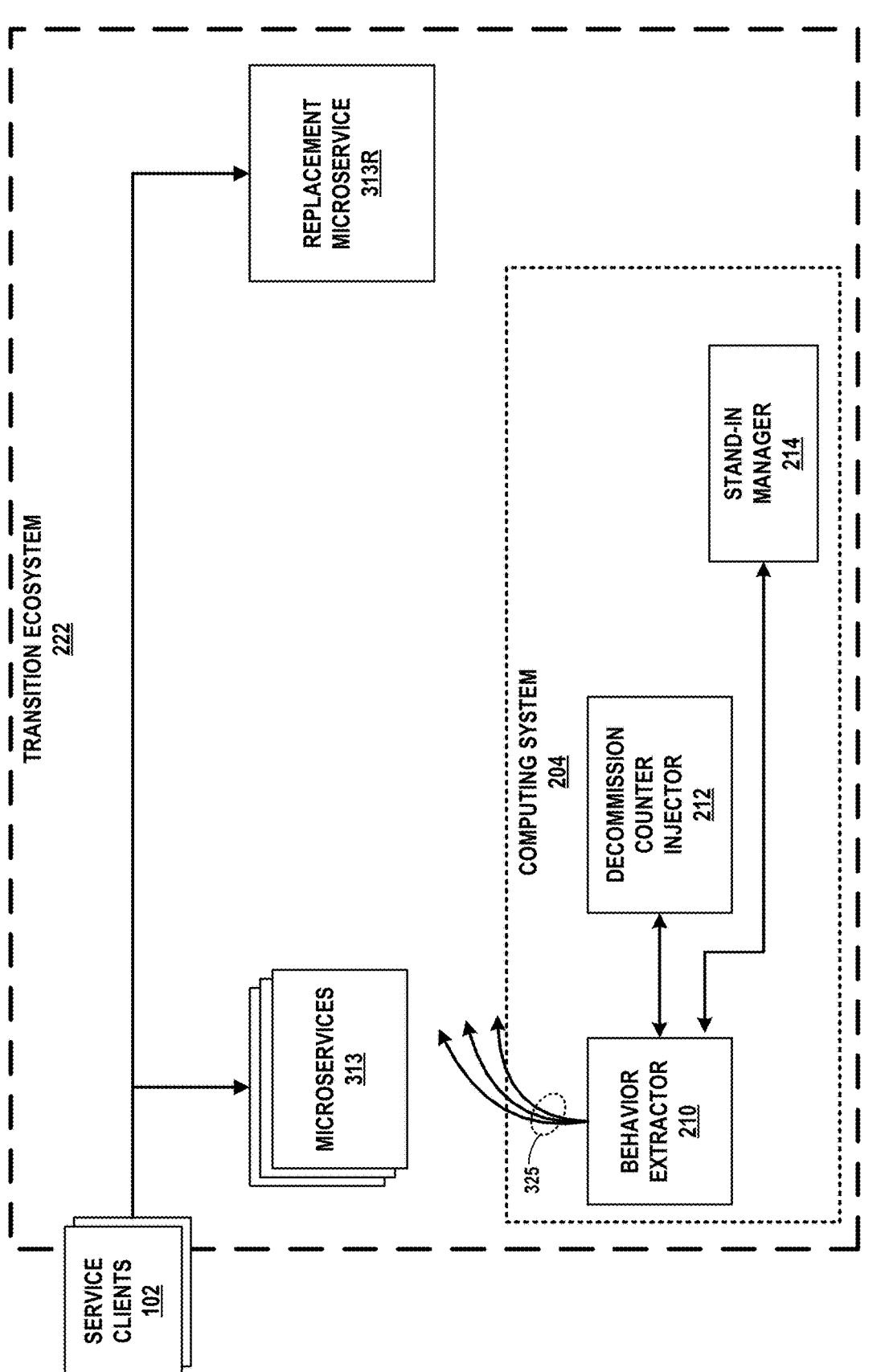

FIG. 3D illustrates an example computing system completing the transition from a legacy microservice to a replacement microservice, in accordance with one or more aspects of the present disclosure. FIG. 3D illustrates replacement microservice 313R processing traffic in transition ecosystem 222 following the decommissioning of stand-in microservice 313P. After transitioning microservice 313L to microservice 313R, behavior extractor 210 may continue to crawl transaction ecosystem 222 and identify additional microservices 313 that can or should be transitioned to a replacement service and deallocated. Behavior extractor 210 may therefore repeat a form of the process described for additional microservices 313.

Figure 4:
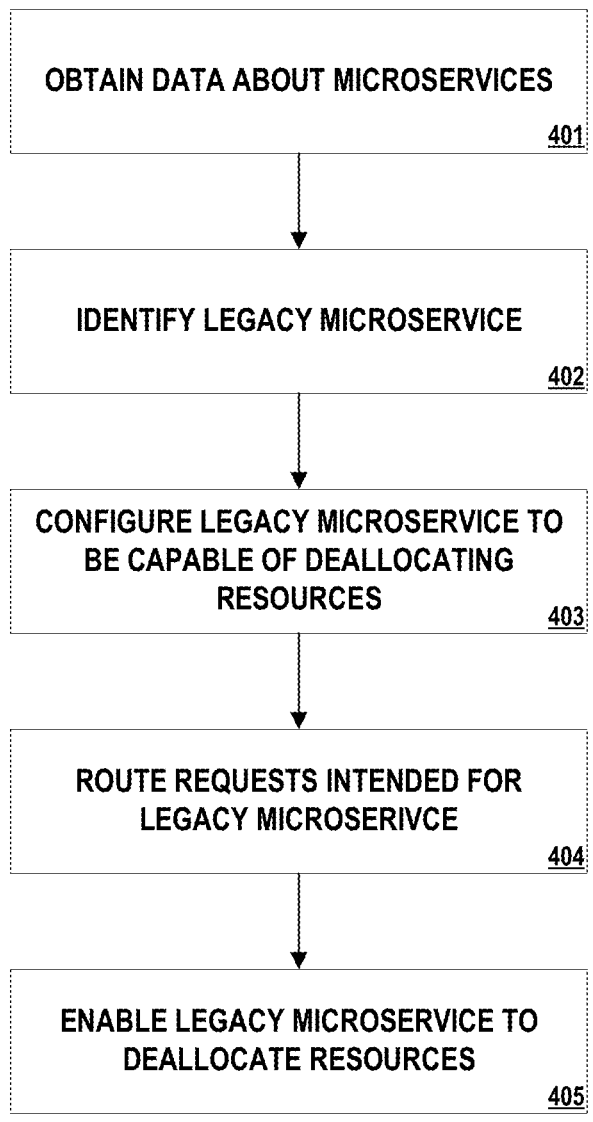
FIG. 4 is a flowchart illustrating an example operation of a transition ecosystem in accordance with one or more techniques of this disclosure.

FIG. 4 is a flow diagram illustrating operations performed by an example computing system in accordance with one or more aspects of the present disclosure. FIG. 4 is described below within the context of computing system 200 of FIG. 2. In other examples, operations described in FIG. 4 may be performed by one or more other components, modules, systems, or devices. Further, in other examples, operations described in connection with FIG. 4 may be merged, performed in a difference sequence, omitted, or may encompass additional operations not specifically illustrated or described.

In the process illustrated in FIG. 4, and in accordance with one or more aspects of the present disclosure, computing system 204 may obtain data about microservices (401). For example, behavior extractor 210 of computing system 204 causes communication unit 205 to output signals over a network. Microservices 313 in the transaction ecosystem (see FIG. 3A) detect the signals and output responsive signals. Communication unit 205 of computing system 204 detect the responsive signals and output information about the responsive signals to behavior extractor 210 of computing system 204. Computing system 204 determines that the responsive signals include data about traffic patterns, usage, and other information sufficient to identify various microservices 313 that can or should be decommissioned.

Computing system 204 may identify a legacy microservice (402). For example, computing system 204 identifies a legacy microservice such as microservice 313L (see FIG. 3A) that meets one or more criteria for decommissioning. Computing system 204 determines that legacy microservice 313L is eligible for decommissioning based on information collected by behavior extractor 210, such as the availability of newer revisions of the legacy microservice, usage statistics of the legacy microservice, and other factors.

Computing system 204 may configure the legacy microservice to be capable of deallocating the resources it consumes (403). For example, computing system 204 utilize a decommission counter injector to modify the legacy microservice with modifications such as commands and/or software code. Such commands and/or software code enable the legacy microservice to deallocate the resource it consumes. In some examples, computing system 204 uses the decommission counter injector to inject a destructor plug-in, such as destructor plug-in 304 as illustrated in FIG. 3B for example, into legacy microservice 313L (or the container executing microservice 313L). Computing system 204 uses the destructor plug-in to modify the legacy microservice and prepare it for decommissioning.

Computing system 204 may route requests intended for the legacy microservice (404). For example, computing system 204 identifies requests intended for legacy microservice 313L and reroutes the requests to a stand-in microservice such as stand-in microservice 313P (illustrated in FIG. 3B, for example). Computing system 204 routes requests to stand-in microservice 313P to ease the transition from the legacy microservice to the replacement microservice and to ensure that users do not lose access to functionality provided by legacy microservice 313L. Computing system 204 may route requests intended for legacy microservice 313L so that the routing of the requests is transparent to users.

Computing system 204 may enable the legacy microservice to deallocate resources (405). For example, computing system 204 enables destructor plug-in 304 to decommission the legacy microservice and deallocate its resources. Computing system 204 enables destructor plug-in 304 to execute one or more commands or elements of software to deallocate the resources of the legacy microservice.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing system 104, compute nodes 103, computing system 204, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each depict at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the illustrations and/or may include additional devices and/or components not shown in the illustrations.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, or optical disk storage, magnetic disk storage, or other magnetic storage devices, flash memory, or any other medium that can be used to store desired program code in the form of instructions or data structures and that can be accessed by a computer. Also, any connection may properly be termed a computer-readable medium. For example, if instructions are transmitted from a website, server, or other remote source using a wired (e.g., coaxial cable, fiber optic cable, twisted pair) or wireless (e.g., infrared, radio, and microwave) connection, then the wired or wireless connection is included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
obtaining, by a computing system, usage statistics indicating traffic to a plurality of microservices that are available to provide services on a network;
identifying, by the computing system and based on the usage statistics, a legacy microservice to be decommissioned, wherein the legacy microservice is included in the plurality of microservices available to provide services on the network, and wherein making the legacy microservice available on the network consumes resources on the network;
configuring the legacy microservice, by the computing system, to be capable of deallocating the resources consumed on the network;
routing, by the computing system, requests intended for the legacy microservice to a stand-in microservice;
after routing requests intended for the legacy microservice to the stand-in microservice, enabling, by the computing system, the legacy microservice to deallocate the resources;
routing, by the computing system, requests intended for the stand-in microservice to a replacement microservice; and
after routing the requests intended for the stand-in microservice to the replacement microservice, deallocating, by the computing system, the stand-in microservice.

2. The method of claim 1, wherein obtaining the usage statistics includes:
crawling the network to obtain the usage statistics.

3. The method of claim 1, wherein identifying the legacy microservice includes:
identifying, based on traffic patterns in the network, a replacement microservice that is available to replace the legacy microservice.

4. The method of claim 3, wherein identifying the replacement microservice includes:
determining that traffic processed by the replacement microservice exceeds a threshold.

5. The method of claim 3, wherein identifying the replacement microservice includes:
determining that the replacement microservice provides at least some functionality of the legacy microservice.

6. The method of claim 3, wherein identifying the replacement microservice includes:
determining that traffic to the replacement microservice exceeds traffic to another microservice that performs functions similar to the legacy microservice.

7. The method of claim 1, wherein routing requests intended for the legacy microservice to the stand-in microservice includes:
initializing, by the computing system, the stand-in microservice.

8. The method of claim 7, the method further comprising:
evaluating, by the computing system, whether the stand-in microservice can replace the legacy microservice.

9. The method of claim 7, wherein the stand-in microservice consumes additional resources on the network, and wherein the method further comprises:
configuring the stand-in microservice, by the computing system, to be capable of deallocating the additional resources.

10. The method of claim 9, wherein initializing the stand-in microservice includes:

initializing a microservice based on the replacement microservice.

11. The method of claim 1, wherein configuring the legacy microservice to be capable of deallocating the resources consumed on the network includes:

configuring the legacy microservice through inversion of control.

12. The method of claim 1, wherein configuring the legacy microservice to be capable of deallocating the resources consumed on the network includes:

configuring the legacy microservice through a plug-in configured to execute within a container hosting the legacy microservice, wherein the plug-in is self-appointed to execute within the container.

13. The method of claim 12, wherein configuring the legacy microservice to be capable of deallocating the resources consumed on the network further includes:

enabling the plug-in to instantiate a counter; and configuring the legacy microservice through a plug-in configured to execute within a container hosting the legacy microservice.

14. A computing system comprising a memory device and processing circuitry having access to the memory device, wherein the processing circuitry is configured to:

obtain usage statistics indicating traffic to a plurality of that are available to provide services on a network;

identify based on the usage statistics, a legacy microservice to be decommissioned, wherein the legacy microservice is included in the plurality of microservices available to provide services on the network, and wherein making the legacy microservice available on the network consumes resources on the network;

configure the legacy microservice to be capable of deallocating the resources consumed on the network;

route requests intended for the legacy microservice to a stand-in microservice;

after routing requests intended for the legacy microservice to the stand-in microservice, enable the legacy microservice to deallocate the resources;

route requests intended for the stand-in microservice to a replacement microservice; and deallocate, after routing the requests intended for the stand-in microservice to the replacement microservice, the stand-in microservice.

15. The computing system of claim 14, wherein to obtain the usage statistics, the processing circuitry is further configured to:

crawl the network to obtain the usage statistics.

16. The computing system of claim 14, wherein to route requests intended for the legacy microservice to the stand-in microservice, the processing circuitry is further configured to:

initialize the stand-in microservice.

17. The computing system of claim 16, wherein the stand-in microservice consumes additional resources on the network, and wherein the processing circuitry is further configured to:

configure the stand-in microservice to be capable of deallocating the additional resources.

18. The computing system of claim 14, wherein to configure the legacy microservice to be capable of deallocating the resources consumed on the network, the processing circuitry is further configured to:

configure the legacy microservice through a plug-in configured to execute within a container hosting the legacy microservice, wherein the plug-in is self-appointed to execute within the container.

19. The computing system of claim 18, wherein to configure the legacy microservice to be capable of deallocating the resources consumed on the network, the processing circuitry is further configured to:

enable the plug-in to instantiate a counter; and configure the legacy microservice through a plug-in configured to execute within a container hosting the legacy microservice.

20. Non-transitory computer-readable storage media configured to cause one or more processors to:

obtain usage statistics indicating traffic to a plurality of that are available to provide services on a network;

identify based on the usage statistics, a legacy microservice to be decommissioned, wherein the legacy microservice is included in the plurality of microservices available to provide services on the network, and wherein making the legacy microservice available on the network consumes resources on the network;

configure the legacy microservice to be capable of deallocating the resources consumed on the network;

route requests intended for the legacy microservice to a stand-in microservice;

after routing requests intended for the legacy microservice to the stand-in microservice, enable the legacy microservice to deallocate the resources;

route requests intended for the stand-in microservice to a replacement microservice; and deallocate, after routing the requests intended for the stand-in microservice to the replacement microservice, the stand-in microservice.

* * * * *